US011657588B2

(12) United States Patent
Wang et al.

(10) Patent No.: US 11,657,588 B2
(45) Date of Patent: May 23, 2023

(54) PHYSICS BASED MANIPULATION

(71) Applicant: ADOBE INC., San Jose, CA (US)

(72) Inventors: Jui-hsien Wang, Bellevue, WA (US);
Jeremie Dumas, Seattle, WA (US);
Daniel Kaufman, Seattle, WA (US)

(73) Assignee: ADOBE INC., San Jose, CA (US)

( * ) Notice: Subject to any disclaimer, the term of this patent is extended or adjusted under 35 U.S.C. 154(b) by 0 days.

(21) Appl. No.: 17/072,729

(22) Filed: Oct. 16, 2020

(65) Prior Publication Data

US 2022/0122334 A1 Apr. 21, 2022

(51) Int. Cl.
*G06T 19/20* (2011.01)
*G06F 3/04815* (2022.01)
*G06T 17/00* (2006.01)
*G06F 3/0482* (2013.01)

(52) U.S. Cl.
CPC .......... *G06T 19/20* (2013.01); *G06F 3/04815* (2013.01); *G06T 17/00* (2013.01); *G06F 3/0482* (2013.01); *G06T 2200/24* (2013.01); *G06T 2210/21* (2013.01); *G06T 2219/2004* (2013.01); *G06T 2219/2016* (2013.01)

(58) Field of Classification Search
CPC .................................................. G06T 2210/21
See application file for complete search history.

(56) References Cited

U.S. PATENT DOCUMENTS

| | | | | |
|---|---|---|---|---|
| 8,000,947 B1 * | 8/2011 | Qureshi | ................... | G06T 13/20 703/6 |
| 2006/0149516 A1 * | 7/2006 | Bond | ...................... | G06F 30/20 703/6 |
| 2014/0078144 A1 * | 3/2014 | Berriman | ............ | G06F 3/04817 345/426 |
| 2017/0091977 A1 * | 3/2017 | West | .................... | G06F 3/04883 |
| 2021/0089628 A1 * | 3/2021 | Mitrovic | ................. | G06F 30/20 |
| 2022/0233251 A1 * | 7/2022 | Bowling | ................ | A61B 34/35 |

FOREIGN PATENT DOCUMENTS

| | | |
|---|---|---|
| WO | 2018017626 | 1/2018 |
| WO | 2020163549 | 8/2020 |

OTHER PUBLICATIONS

D.J. Rijlaarsdam, "Modelling damping in linear dynamic systems", Final Bachelor Project, DCT 2005.39, Apr. 21, 2005, Technische Universiteit Eindhoven (Year: 2005).*
Berserk Games, "Tabletop Simulator Tutorials Part 2—Advanced Controls (2017)", published at YouTube as of Aug. 23, 2017 at https://www.youtube.com/watch?v=n5JfRMava7w and archived at Archive.org as of at least Jul. 31, 2019 (Year: 2017).*
Combination Search and Examination Report dated Apr. 5, 2022 in related Great Britain Patent Application No. 2111306.3 (9 pages).

* cited by examiner

*Primary Examiner* — William A Beutel
(74) *Attorney, Agent, or Firm* — F. Chau & Associates, LLC

(57) ABSTRACT

Systems and methods for three-dimensional (3D) modeling are described. Embodiments of the inventive concept are configured to receive manipulation input for editing a scene in a static 3D modeling application, perform a physics simulation based on the manipulation input, wherein the physics simulation comprises a plurality of simulation steps performed based on a set of motion constraints configured for the static 3D modeling application, and apply a change to the scene in the static 3D modeling application based on the physics simulation.

20 Claims, 11 Drawing Sheets

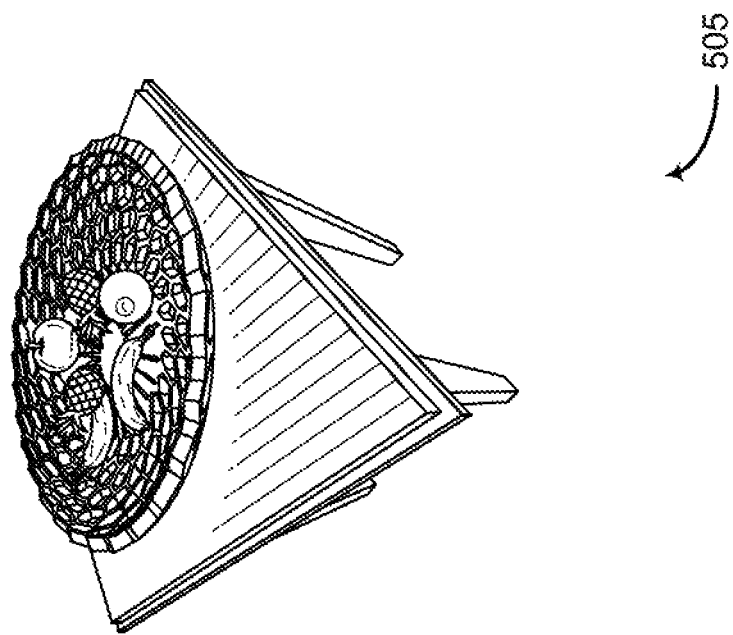
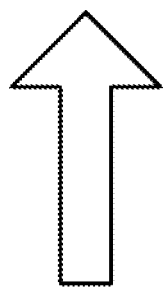
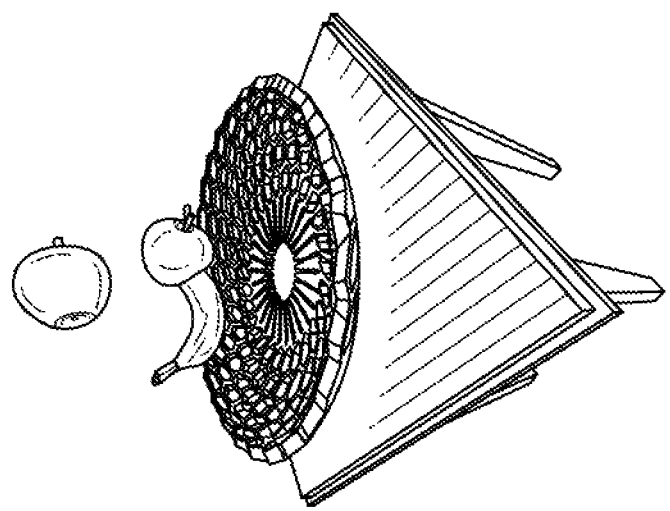
FIG. 5

```
Algorithm 1: PBL stepping system
 1 Function substeppedUpdate()
    Input  : S, maxIte, thres
    Output:
 2 foreach (o, T) ∈ S do
 3  |  Initialize o's interpolator/substepper Δ_o using current
    |  transformation c and target transformation T;
 4 r ← 0, j ← 0
 5 for i ← 0 to maxIte do
 6  |  if i − j > 3 then
 7  |  |  break;          /* TARGET DRIFTS TOO FAR APART, END TRANSFORM HERE */
 8  |  foreach o ∈ S do
 9  |  |  x ←Calculate j-th interpolated transformation for the current
    |  |     substep with Δ_o;
10  |  |  Set o's 6DOF constraint position to x;
11  |  forward-time-step();
12  |  r ← residual of current simulation step;
13  |  if r < thres then
14  |  |  j += 1;
15 return all achieved transformations of each object
```

FIG. 6

PHYSICS BASED MANIPULATION

BACKGROUND

The following relates generally to the technological field of three dimensional (3D) modeling.

3D modeling, or 3D computer graphics, is the technology of developing a mathematical representation of any surface of an object in three dimensions using customized software. 3D computer modelling software is used to produce 3D models. In some cases, 3D models represent a physical body using a collection of points in three-dimensional space. These points are connected by various geometric entities such as triangles, lines, curved surfaces, etc. 3D models can be used in various industries including computer games, medical research, architecture, and computer-aided design (CAD). 3D model designers are able to view the created 3D model from various directions and viewpoints, and make changes or improvements based on the 3D model.

Editing 3D models with conventional 3D modelling tools is a time intensive process. For example, 3D modelling tools may require a user to edit position and orientation variables manually. Furthermore, conventional 3D modelling tools do not prevent objects from overlapping each other. Thus, arranging multiple objects in a 3D scene can take many editing iterations to ensure that the objects are arranged in a natural way. Therefore, there is a need in the art for improved 3D modelling tools that enable users to quickly and easily manipulate objects in a 3D scene.

SUMMARY

The present disclosure describes systems and methods for editing a three-dimensional (3D) scene. Embodiments of the inventive concept capture editing inputs from a 3D modelling application, translate the inputs into simulation parameters for a physics engine, and perform a constrained simulation on objects in the 3D scene. The constraints on the simulation are configured specifically for editing a 3D scene, for example, by damping motion, restricting transfer of momentum between objects, and preventing objects from overlapping while attempting to satisfy the requested transform. Once the simulation is complete, the results are used to modify the position and orientation of objects in the 3D scene.

A method, apparatus, and non-transitory computer readable medium for 3D modeling are described. Embodiments of the method, apparatus, and non-transitory computer readable medium are configured to receive manipulation input for editing a scene in a static 3D modeling application, perform a physics simulation based on the manipulation input, wherein the physics simulation comprises a plurality of simulation steps performed based on a set of motion constraints configured for the static 3D modeling application, and apply a change to the scene in the static 3D modeling application based on the physics simulation.

A method, apparatus, and non-transitory computer readable medium for 3D modeling are described. Embodiments of the method, apparatus, and non-transitory computer readable medium are configured to receive manipulation input for editing a scene in a static 3D modeling application, identify a set of motion constraints, perform a plurality of simulation steps based on the manipulation input and the motion constraints, wherein each of the plurality of simulation steps is performed based on different set of simulation parameters, and apply a change to the scene in the static 3D modeling application based on a result of the plurality of simulation steps.

An apparatus and method for 3D modeling are described. Embodiments of the apparatus and method include a 3D modelling application configured to represent a 3D scene, a physics engine configured to perform a physics simulation on the 3D scene based on a manipulation input from the 3D modelling application, wherein the physics simulation comprises a plurality of simulation steps performed based on a set of motion constraints, and an interface component configured to convert the manipulation input from the 3D modelling application into a set of parameters for performing the physics simulation.

BRIEF DESCRIPTION OF THE DRAWINGS

FIGS. 4 and 5 show examples of editing a 3D scene according to aspects of the present disclosure.

FIG. 6 shows an example of a physics simulation algorithm according to aspects of the present disclosure.

DETAILED DESCRIPTION

Figure 1:
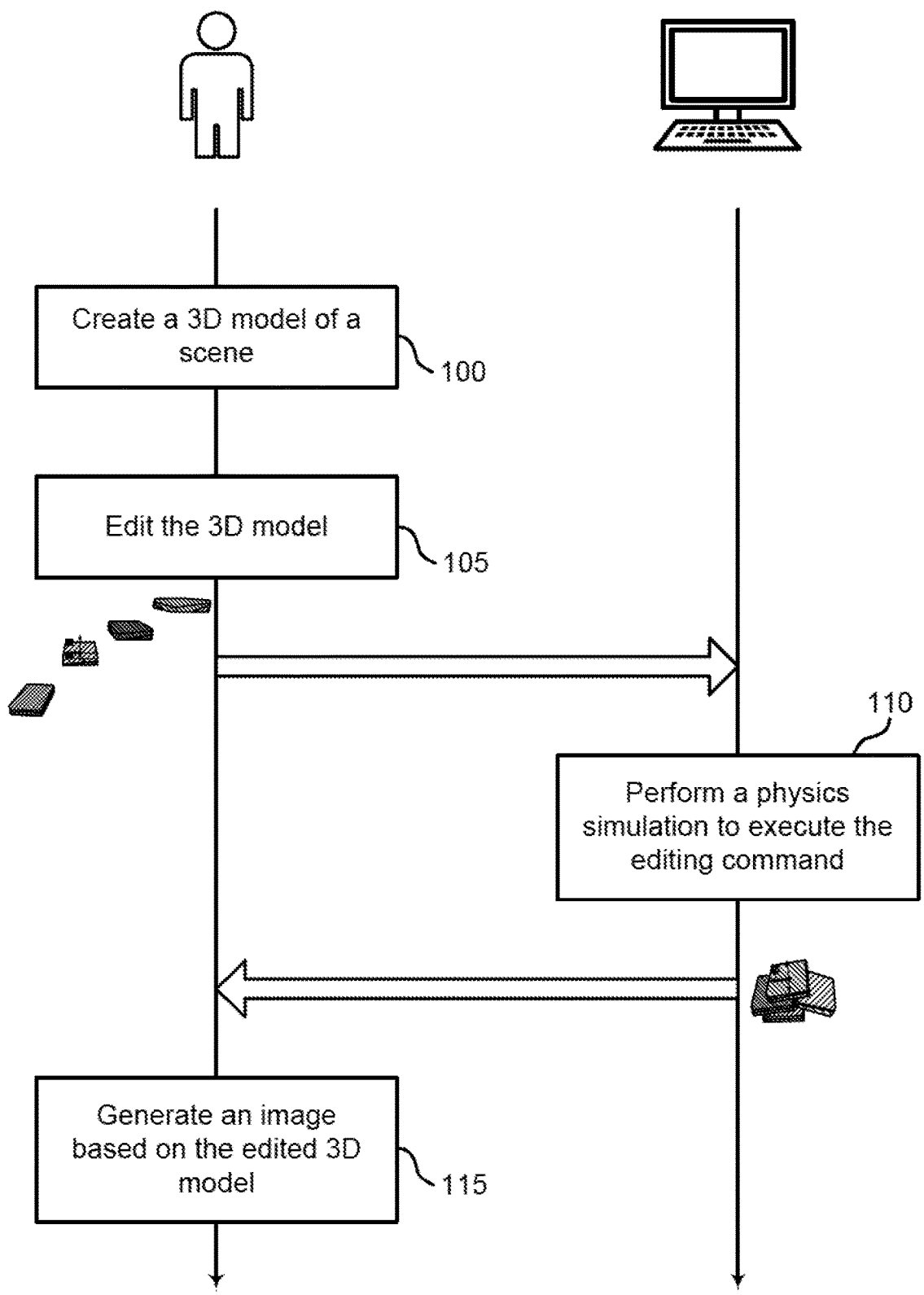
FIG. 1 shows an example of a process for three-dimensional (3D) modeling according to aspects of the present disclosure.

The present disclosure describes systems and methods for editing a three-dimensional (3D) scene. Embodiments of the inventive concept capture editing inputs from a 3D modelling application, translate the inputs into simulation parameters for a physics engine, and perform a constrained simulation on objects in the 3D scene. The constraints on the simulation are configured specifically for editing a 3D scene, for example, by damping motion, restricting transfer of momentum between objects, and preventing objects from overlapping while attempting to satisfy the requested transform. Once the simulation is complete, the results are used to modify the position and orientation of objects in the 3D scene.

Arranging scenes with 3D modeling tools are challenging. The editing process requires performing a detailed examination and many low-level edits of the position and orientation of multiple individual objects (e.g., camera movements, zoom in and out). Obtaining pleasing, natural and non-intersecting layouts is difficult because conventional 3D modeling tools do not enforce physics-based constraints.

Thus, it is time consuming for even experienced 3D editors to arrange the placement of just a few objects (e.g. a set of textbooks stacked together on a surface). In addition, conventional 3D modeling tools are not capable of simulating dynamic arrangements, such as an arrangement that results from dropping multiple objects. In many cases, simulated behaviors from these 3D modeling tools are too sensitive for direct manipulation. For example, small changes can send objects flying in unintended directions or cause them to rebound off one another.

Therefore, simulated motion produced by conventional 3D modeling tools do not enable users to perform natural edits by pushing or pulling objects to a desired location. By contrast, natural arrangements in the real world are conveniently done by simply dropping items on top of each other and nudging them around due to gravity and inertia.

However, conventional 3D modeling tools are unable to perform natural and efficient edits that take advantage of the user's physical intuition because existing physics engines have secondary effects that make them unsuitable for 3D modelling. That is, technical challenges have prevented 3D software from incorporating existing physics engines to perform more natural edits. For example, when using a physics engine to simulate motion, momentum imparted to an object might cause it to keep moving longer than desired, or to transfer motion to objects the user did not intend to move.

Therefore, the present disclosure provides systems and methods for integrating 3D modelling tools with a physics engine to make editing 3D scenes easier and more efficient. Embodiments of the present inventive concept overcome the technical challenges associated with using a physics simulation to edit a 3D scene by introducing simulation parameters and constraints that are suited to 3D modelling, and performing validation checks during the simulation process. Accordingly, an improved 3D modelling tool according to embodiments of the inventive concept automatically integrates physics simulation with interactive user manipulation requests, and regulates extent of physics to inject during each manipulation based on user feedback.

Some embodiments include a rigid-body physics engine that can perform a physics simulation on a 3D scene based on a manipulation input, and a set of motion constraints. The system integrates the physics simulation with interactive user manipulation requests from the 3D modelling software. An interface between the 3D modelling application and the physics engine may regulate how much physics to inject during each edit based on user feedback to ensure stable changes and fully controllable motions.

As a result, the improved 3D modeling tool of the present disclosure allows users to focus on high-level targets for manipulation while the physical simulation of the tool automatically provides low-level natural adjustments and prevents objects from intersecting. In some examples, an improved 3D modeling system or device may be described as a physics based manipulation (PBM) system. A PBM system may bind 3D manipulation input, including translation, rotation, and scaling to physics-based manipulation. The PBM system applies physics-aware manipulation to provide intuitive arrangement control such that users can avoid detailed low-level fine-tuning. As a result, layout or digital object placement in 3D scenes is close to the convenience and natural look of real world manipulations.

FIG. 1 shows an example of a process for 3D modeling according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 100, a user creates a 3D model of a scene. The 3D scene includes a set of objects. According to an example, the 3D scene includes four books. In some cases, the operations of this step refer to, or may be performed by, a user as described with reference to FIG. 2.

At operation 105, the user edits the 3D model. The user is able to interact with physics dynamics related to the set of objects in the 3D model (i.e., 3D scene). The user can move and rotate the set of objects in an arbitrary direction. Each object has x, y, and z axes (shown as arrow icons) for the convenience of direction. The user can view the edited 3D model through the user interface of 3D modeling application. In some cases, the operations of this step refer to, or may be performed by, a user as described with reference to FIG. 2.

At operation 110, the system performs a physics simulation to execute the editing command. The system performs the physics simulation based on manipulation commands from the user. The system executes the physics simulation according to some constraints to prevent the set of objects from undesired physics. For example, one of the books may collide with another book, and the response from collision is table (i.e., do not bounce due to secondary physics effects). In addition, the books have a non-intersecting layout which looks natural as in real world manipulation. In the example above, the user drags books together to stack on top of each other. The user can easily control these changes to the objects in the 3D scene. In some cases, the operations of this step refer to, or may be performed by, a physics engine as described with reference to FIGS. 2 and 3.

At operation 115, the user generates an image based on the edited 3D model. The generated image is referred to as edited 3D scene. In some cases, the edited 3D scene has the same set of objects as in the original 3D scene. In the example above, the edited 3D scene has four books which are stacked on top of each other. The layout of the books looks natural and non-intersecting. The system controls the detailed fine-tuning of the books (e.g., position, gravity, inertia, motion), therefore it takes the user less time to complete the 3D editing.

In some cases, the improved 3D modeling system or device is used for generating still images or a sequence of still images forming a movie. In some other cases, the generated result from the improved 3D modeling system is a 3D digital geometry for other uses. In some cases, the operations of step 115 refer to, or may be performed by, a user as described with reference to FIG. 2. In some other cases, the operations of this step refer to, or may be performed by, a 3D modelling application as described with reference to FIGS. 2 and 3.

Figure 2:
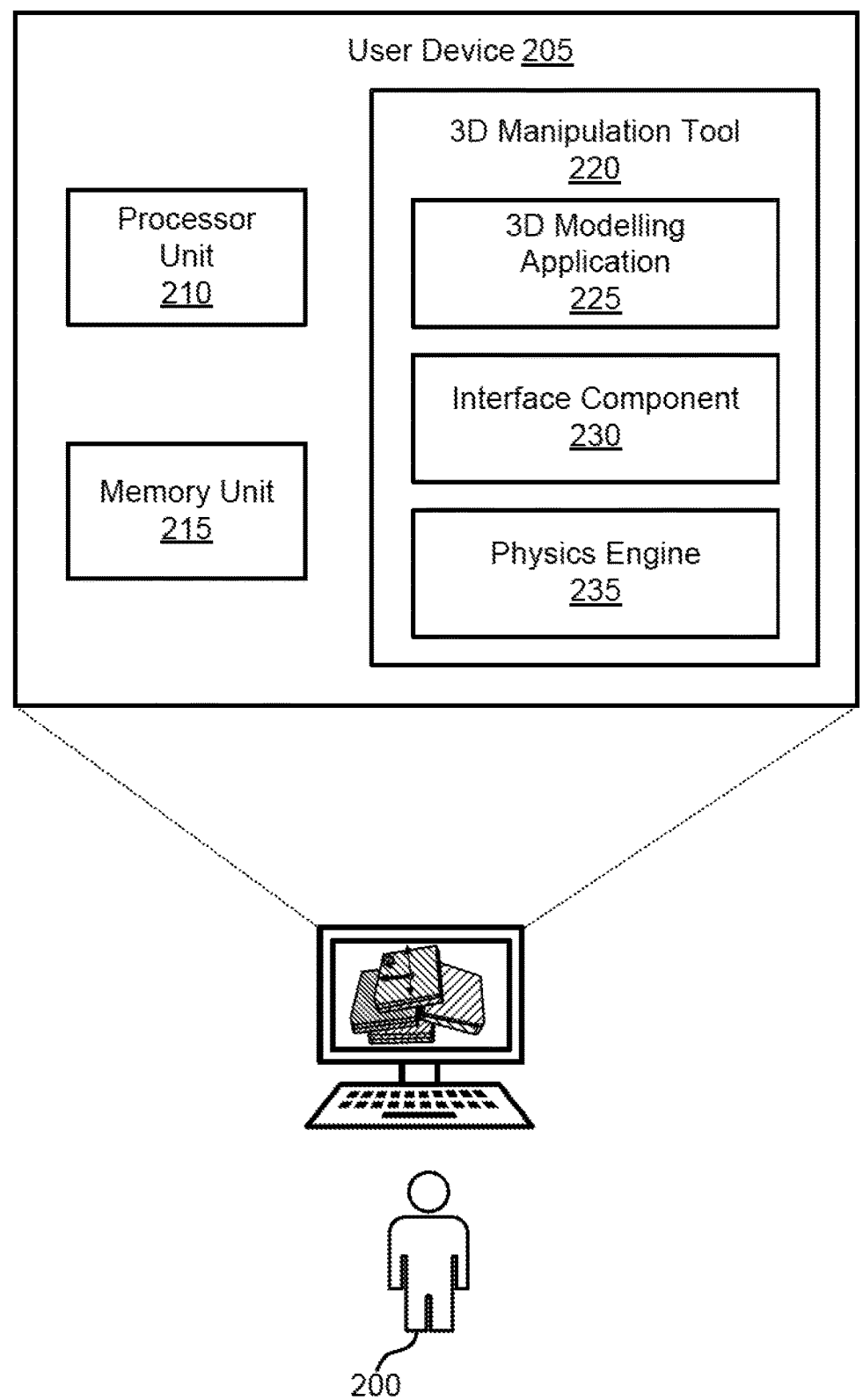
FIG. 2 shows an example of a system for 3D modeling according to aspects of the present disclosure.

FIG. 2 shows an example of a system for three-dimensional (3D) modeling according to aspects of the present disclosure. The example shown includes user 200 and user device 205. In one embodiment, user device 205 includes processor unit 210, memory unit 215, and 3D manipulation tool 220. In one embodiment, 3D manipulation tool 220 includes 3D modelling application 225, interface component 230, and physics engine 235.

The user 200 may communicate with user device 205. For example, the user 200 may input manipulation commands to an user interface of the 3D manipulation tool 220 with respect to a set of objects in a 3D scene. The manipulation commands may include requested transforms of the set of objects in the 3D scene (e.g., rotation, move). The user can view the edited 3D scene on the user device 205 after the 3D manipulation tool 220 performs physics simulation based on manipulation input from the user 200.

The user device 205 may be a personal computer, laptop computer, mainframe computer, palmtop computer, personal assistant, mobile device, or any other suitable processing apparatus.

A processor unit 210 is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the processor unit 210 is configured to operate a memory array using a memory controller. In other cases, a memory controller is integrated into the processor unit 210. In some cases, the processor unit 210 is configured to execute computer-readable instructions stored in a memory to perform various functions. In some embodiments, a processor unit 210 includes special purpose components for modem processing, baseband processing, digital signal processing, or transmission processing.

Examples of a memory unit 215 include random access memory (RAM), read-only memory (ROM), or a hard disk. Examples of memory unit 215 include solid state memory and a hard disk drive. In some examples, memory unit 215 is used to store computer-readable, computer-executable software including instructions that, when executed, cause a processor to perform various functions described herein. In some cases, the memory unit 215 contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory unit 215 store information in the form of a logical state.

According to some embodiments, 3D modelling application 225 receives manipulation input for editing a scene in a static 3D modeling application. 3D modelling application 225 applies a change to the scene in the static 3D modeling application based on the physics simulation. 3D modelling application 225 generates a still image of the scene based on the applied change. In some examples, 3D modelling application 225 receives user 200 mode selection input selecting a simulation mode from a set of modes including the simulation mode and a direct manipulation mode, where the physics simulation is performed based on the selecting the simulation mode and the direct manipulation mode does not utilize the physics simulation. In some examples, the scene includes a set of objects, the physics simulation is based on the set of objects, and the change to the scene includes adjusting a position or an orientation of each of the set of objects. In some examples, the manipulation input includes a direct manipulation command for the static 3D modeling application that is independent of the physics simulation. In some examples, 3D modelling application 225 captures one or more motion inputs from an input device, where the manipulation input includes the one or more motion inputs.

According to some embodiments, 3D modelling application 225 receives manipulation input for editing a scene in a static 3D modeling application. 3D modelling application 225 applies a change to the scene in the static 3D modeling application based on a result of the set of simulation steps. In some examples, 3D modelling application 225 receives input from a user 200 specifying one or more of the motion constraints, where a physics simulation is performed based on the received input.

According to some embodiments, 3D modelling application 225 is configured to represent a 3D scene (i.e., original 3D scene). When new transformations are computed, these new transformations are passed back to 3D modelling application 225, where the 3D modelling application 225 is configured to represent an edited 3D scene. In some cases, the edited 3D scene includes a same set of objects as in the original 3D scene. However, geometric/locational attributes are changed with respect to at least one of the set of objects (e.g., rotation, move). According to an example, the original 3D scene includes four books spaced apart from each other. After performing physics simulation, the edited 3D scene includes the same four books but stacked on top of one another. 3D modelling application 225 is an example of, or includes aspects of, the corresponding element described with reference to FIG. 3.

According to some embodiments, interface component 230 identifies a threshold number of simulation steps and a target condition. Interface component 230 identifies a set of simulation parameters for each of the set of simulation steps, where the set of simulation steps are performed based on the corresponding set of simulation parameters. The set of simulation parameters includes a target location and a spring force. In some examples, interface component 230 identifies a first set of simulation parameters based on the manipulation input. Interface component 230 identifies a second set of simulation parameters based on the manipulation input, the output of the first simulation step, and the determination that the output of the first simulation step is valid.

According to some embodiments, interface component 230 identifies a set of motion constraints. The motion constraints prevent different objects from occupying the same space. Alternatively or additionally, the motion constraints prevent momentum from being transferred from one object to another object. In some examples, the motion constraints include a Rayleigh dampening parameter that reduces a velocity of at least one objects by over 90 percent during each of the set of simulation steps.

According to some embodiments, interface component 230 is configured to convert the manipulation input from the 3D modelling application 225 into a set of parameters for performing the physics simulation. In some examples, the interface component 230 is further configured to convert an output of the physics simulation into a change command within the 3D modelling application 225. Interface component 230 is an example of, or includes aspects of, the corresponding element described with reference to FIG. 3.

According to an embodiment, interface component 230 is configured to damp the physics simulation to obtain a quasi-static motion. Velocities are rapidly dissipated, and collision-response does not include restitution. This makes manipulated objects respond in intuitive ways to contact with inertia (e.g., a rod pulled against an edge rotates about it) but at the same time the response is stable. The secondary physics effects are avoided such that 3D manipulation tool 220 can easily control these changes (e.g. motions do not continue to change once manipulation is over, contacts do not respond with bouncing). Therefore, 3D manipulation tool 220 obtains stable and responsive physics from user input.

According to some embodiments, physics engine 235 performs a physics simulation based on the manipulation input, where the physics simulation includes a set of simulation steps performed based on a set of motion constraints configured for the static 3D modeling application. Physics engine 235 performs the set of simulation steps. In some examples, physics engine 235 determines that the threshold number of simulation steps has been met, or that the target condition has been met. Physics engine 235 terminates the physics simulation based on the determination. In some examples, physics engine 235 performs a first simulation step of the set of simulation steps based on the first set of simulation parameters. Physics engine 235 determines that an output of the first simulation step is valid. In some examples, physics engine 235 performs a second simulation step based on the second set of simulation parameters. In some examples, physics engine 235 performs a constraint minimization computation on the output of the first simulation step, where the determination that the output of the first simulation step is valid is based on the constraint minimization computation. In some examples, physics engine 235 performs a first simulation step of the set of simulation steps based on the first set of simulation parameters. Physics engine 235 determines that an output of the first simulation step is invalid. Physics engine 235 refines the output of the first simulation step based on the determination that the output of the first simulation step is invalid. In some examples, physics engine 235 performs a constraint minimization computation on the output of the first simulation step, where the determination that the output of the first simulation step is invalid is based on the constraint minimization computation.

According to some embodiments, physics engine 235 performs a set of simulation steps based on the manipulation input and the motion constraints, where each of the set of simulation steps is performed based on different set of simulation parameters.

According to some embodiments, physics engine 235 is configured to perform a physics simulation on the 3D scene based on a manipulation input from the 3D modelling application 225, where the physics simulation comprises a set of simulation steps performed based on set of motion constraints. Physics engine 235 is an example of, or includes aspects of, the corresponding element described with reference to FIG. 3.

In some cases, taking a single simulated step to complete a goal target (i.e., target transformation) is not stable and/or natural looking. This occurs when current geometries are at a distance from the edit's target. According to an embodiment, to support practical size edits and manipulations, 3D manipulation tool 220 breaks each requested transformation into a sequence of smaller substeps whose interpolation leads to the final requested transform (per a group of objects or a single object).

According to an embodiment, the spring-based target is moved sequentially along this path and, for each step, a simulation time-step is solved. When 3D manipulation tool 220 calls the simulation time-step, a numerical optimization task is solved based on satisfying the damped physics model pulled by the spring and at the same time resolving any collision constraints applied by contacting geometries.

Figure 3:
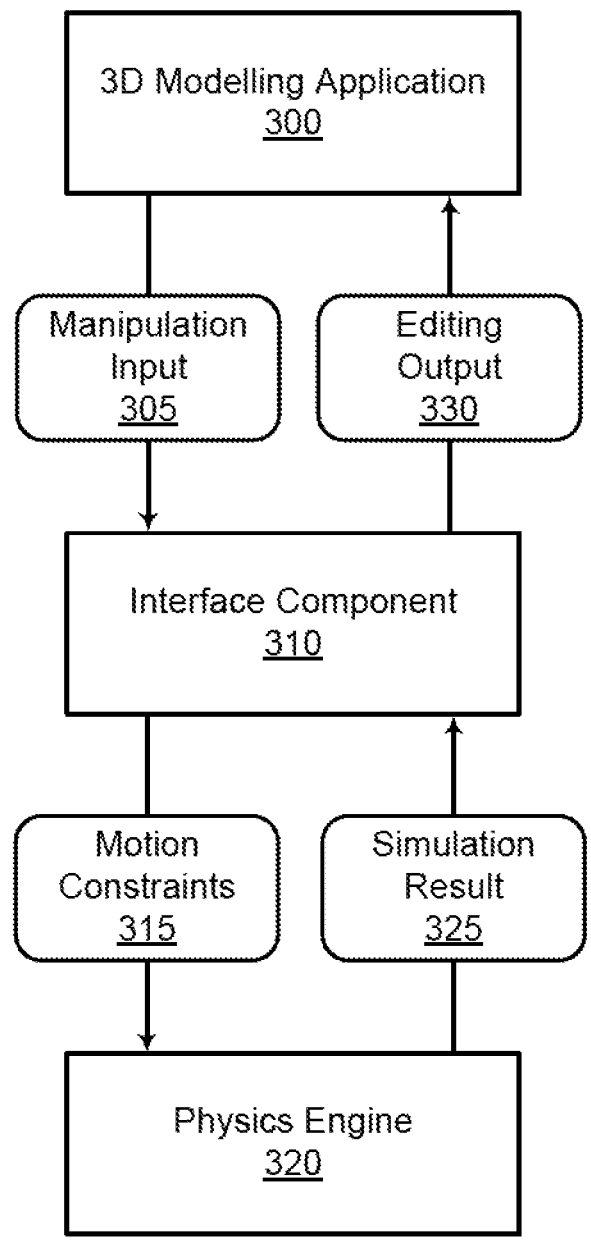
FIG. 3 shows an example of a 3D manipulation process according to aspects of the present disclosure.

FIG. 3 shows an example of a 3D manipulation process according to aspects of the present disclosure. The example shown includes 3D modelling application 300, manipulation input 305, interface component 310, motion constraints 315, physics engine 320, simulation result 325, and editing output 330.

According to some embodiments, 3D modelling application 300 receives manipulation input for editing a scene in a static 3D modeling application. 3D modelling application 300 applies a change to the scene in the static 3D modeling application based on the physics simulation. In some examples, the scene includes a set of objects, the physics simulation is based on the set of objects, and the change to the scene includes adjusting a position or an orientation of each of the set of objects. 3D modelling application 300 is an example of, or includes aspects of, the corresponding element described with reference to FIG. 2.

According to an embodiment, the 3D manipulation tool tracks a set of 3D rigid-body geometries $\mathcal{O}$, each defined by a triangle mesh in a starting (canonical) configuration with its center of mass initially placed at the origin and oriented so that its principle three axes are aligned with the axes in 3D. Each rigid body's current position and orientation is then set by a rigid transform T that transforms (e.g., rotates and translates) this geometry from the canonical one.

All requested operations for manipulating these geometries are received as a set of requested transforms for bodies. A user manipulation is passed as an operation set $\mathcal{S}$ which contains pairs (o, T), where $o \in \mathcal{O}$ is a rigid body in the scene with its requested transform T, as specified by the operation applied by a user in a 3D tool's user interface.

Without physics based layout, all rigid bodies configurations (e.g., position and orientation) are updated to the positions given by the corresponding requested transform in $\mathcal{S}$. According to some embodiments, the 3D manipulation tool is configured to perform physics based layout or manipulation (see algorithm 1 of FIG. 6) to compute new transforms for all rigid bodies in $\mathcal{S}$ that satisfy the requested motion and physical constraints. After computation, new transforms $\mathcal{S}$ are applied instead, overwriting the initially requested ones. In turn these are passed to 3D modelling application 300 of the 3D manipulation tool and treated as the final transformations for all bodies manipulated by the requested operation.

According to an embodiment, interface component 310 is configured to convert the manipulation input from the 3D modelling application 300 into a set of parameters for performing the physics simulation. In some cases, interface component 310 is also referred to as an interaction layer. Interface component 310 identifies a threshold number of simulation steps and a target condition. In one embodiment, interface component 310 identifies a set of simulation parameters for each of the set of simulation steps, where the set of simulation steps are performed based on the corresponding set of simulation parameters. Interface component 310 is an example of, or includes aspects of, the corresponding element described with reference to FIG. 2.

According to an embodiment, interaction is performed by overloading each manipulation's requested state change. Rather than performing the requested operation (i.e., manipulation commands from the user to operate on an object or a group of objects) directly on the input geometries (e.g., textbooks, vases), the 3D manipulation tool passes these commands to an interaction layer (i.e., interface component 310) which mediates between a customized physics simulation engine (i.e., physics engine 320) and a graphics interface. The interaction layer locates a new set of transformations that meet the requested high-level geometry change (e.g., a rotation) while satisfying physics with no intersections. Once these new transformations are computed, they are passed back to user interface (UI) in place of the direct transformations.

According to an embodiment, for each interaction, transformations are set as strong springs that incrementally pull a single geometry or a group of geometries (when group select is enabled) of objects towards goal targets (i.e., target condition). The goal targets are configurations (e.g., rotation and/or translation) the geometries would have if no mediation via physics layout is applied.

A physics engine performing simulated dynamics may be sensitive and not stable during 3D digital manipulations. To obtain stable, responsive physics from user input, one embodiment of the present disclosure strongly damps the physics simulation to obtain a quasi-static motion. Velocities are rapidly dissipated, and collision-response does not include restitution. The 3D manipulation tool makes manipulated objects respond in intuitive ways to contact with inertia (e.g., a rod pulled against an edge rotates about it) but at the same time makes sure that the response is stable. The secondary physics effects are avoided so that the 3D manipulation tool can easily manage these changes. For example, motions do not continue to change once manipulation is over, contacts between objects do not respond with bouncing on a surface or inside a container, etc.

Taking a single simulated step to complete a goal target (i.e., target transformation or position) is not stable. In some cases, taking a single simulated step may not arrive at or get close to the target condition. For example, a physics engine taking a single simulated step may overshoot the target condition. This occurs when current geometries are at a distance from the target transformation. To support practical size edits and manipulations, interface component 310 (i.e., the interaction layer) breaks each requested transformation into a sequence of smaller substeps whose interpolation leads to the final requested transform (per a group of objects or a single object).

According to an embodiment, the spring-based target is moved sequentially along this path and, for each step, a simulation time step is solved. When the system calls the simulation time step, a numerical optimization task is solved based on satisfying the damped physics model pulled by the spring and at the same time resolving any collision constraints applied by contacting geometries.

In some cases, when solving the constrained physics task, a solver does not guarantee the simulation will terminate with a stable and usable solution. Thus, according to an embodiment of the present disclosure, physics engine 320 measures the potential usability of each time step's output by looking at the residual (error) of the optimization after the time step is solved. If this measure is too large, the time step solve is repeated without advancing the target to the next increment. If the time step solve residual is below a tolerance threshold, physics engine 320 advances the target to the next increment. When either the full sequence of substeps is completed, or the tolerance threshold has not been met for three consecutive substeps (i.e., threshold number of simulation steps), interface component 310 (i.e., the interaction layer) passes the resulting final simulated transformation update back as the requested physics manipulation update. In some cases, the threshold number of simulation steps is not limited to three, but can be set as other numbers based on user and/or user device. The resulting final simulated transformation update is also referred to as editing output 330. The editing output 330 is input to the 3D modeling application to generate the edited 3D scene. The edited 3D scene incorporates changes from the requested physics manipulation commands.

Physics engine 320 is configured to perform a physics simulation on the 3D scene based on a manipulation input from the 3D modelling application 300, where the physics simulation comprises a set of simulation steps performed based on a set of motion constraints. Physics engine 320 performs the set of simulation steps. In some examples, physics engine 320 determines that the threshold number of simulation steps has been met, or that the target condition has been met. Physics engine 320 terminates the physics simulation based on the determination. According to one embodiment, physics engine 320 produces simulation result 325 based on the set of simulation steps and simulation result 325 is input to interface component 310. Physics engine 320 is an example of, or includes aspects of, the corresponding element described with reference to FIG. 2.

According to some embodiments, given a rigid body geometry with current transform $T_0$ and user-applied transform $T_1$, physics engine 320 performs substep physics based layout towards the target transform in N substeps determined either by the distance between start and end transform or by a fixed size heuristic. Once N is selected, physics engine 320 interpolates between the two rigid transformations $T_0$, $T_1$ as follows. Physics engine 320 decomposes each transform into its separate translation component, $T_{i,t}$, and rotational components $T_{i,r}$. Translations are represented by $\mathbb{R}^3$ vectors and for rotations represented by quaternions.

Quaternions are a number system that extends the complex numbers, applied to mechanics in 3D space, and calculations involving 3D rotations. The quaternion is defined as the quotient of two directed lines in a three-dimensional space or equivalently as the quotient of two vectors. Alternatively or additionally, quaternions can be used along with methods such as Euler angles and rotation matrices depending on the application. Physics engine 320 performs interpolation to move the translational and rotational components of the targets for each substep $j \in [0, N]$ respectively to:

$$T_t^{(j)} \leftarrow \text{lerp}(T_{0,t}, T_{1,t}) \quad (1)$$

$$T_r^{(j)} \leftarrow \text{slerp}(T_{0,r}, T_{1,r}) \quad (2)$$

where lerp(•) is the standard linear interpolation operation, and slerp(•) denotes standard spherical linear interpolation via quaternions.

As illustrated in FIG. 6 (algorithm 1), each call to forward-time-step advances the rigid body system forward by a single step subject to contact constraints and spring forces. According to an embodiment, linear complementarity programing (LCP) rigid-body contact solver is used. Each time-step computes the solution of a local LCP optimization task where algorithm 1 solves for unknown constraint enforcing impulses $y \in \mathbb{R}^m$ that give new transform updates. To obtain constraint impulses at each step, the LCP conditions are solved:

$$0 \leq Ay + b \perp y \geq 0 \quad (3)$$

Here for a, $b \in \mathbb{R}^m$ the notation $a \perp b$ defines the complementarity condition $a_i b_i = 0$, $\forall i \in [1, m]$. Each row of the inequality $Ay + b \geq 0$ then defines a single constraint of the physical system to be satisfied while the complementarity relationships impose consistency conditions to ensure impulses are physically correct (e.g., contacts push but do not pull).

According to an embodiment, the physics-engine's solver uses projected Gauss-Seidel (PGS). The Gauss-Seidel splitting of $A = L + U$ into lower triangular L, and strictly upper triangular U is applied herein. The solver then proceeds to sequentially visit each constraint row $i \in [1, m]$, updating its corresponding unknown $y_i$ while holding all other unknowns fixed. Concretely, this amounts to multiple outer iterations (indexed here by k) that each pass through all constraint rows (indexed by i). For row i at iteration k, the update is as follows:

$$\Delta_{y_i}^{k+1} = \max\left(0, \frac{1}{a_{ii}}\left(b_i - \sum_{j=1}^{i-1} a_{ij} y_j^{k+1} - \sum_{j=i+1}^{n} a_{ij} y_j^k\right)\right) - y_i^k \quad (4)$$

Locally, this applied change in constraint impulse for row i also gives the error still present in constraint i. As error is driven down, this term goes to zero and provides the per-row residual error as follows:

$$r_i^k = (y_i^{k+1} - y_i^k)^2 = (\Delta_{y_i}^{k+1})^2 \quad (5)$$

In algorithm 1 (see FIG. 6), physics engine 320 takes the inf-norm (as known as infinity norm or max norm) on the residual vector at conclusion of the time step solve:

$$r \leftarrow \max_{i \in [1,m]} r_i \quad (6)$$

This defines the largest constraint error in the current solution and measures how much the current time-step solve (if it is accepted) would violate the contact and spring constraints. In some cases, an aggressive threshold of thres=10 is used. If the residual error is too large, physics engine 320 takes another time step without advancing the target. The underlying physics engine solver is iterative (recall PGS-based) so that this effectively resumes reducing the error right where the previous time-step solve ended and warm-starts the subsequent time-step solve with the output from the previous last solution.

Figure 4:
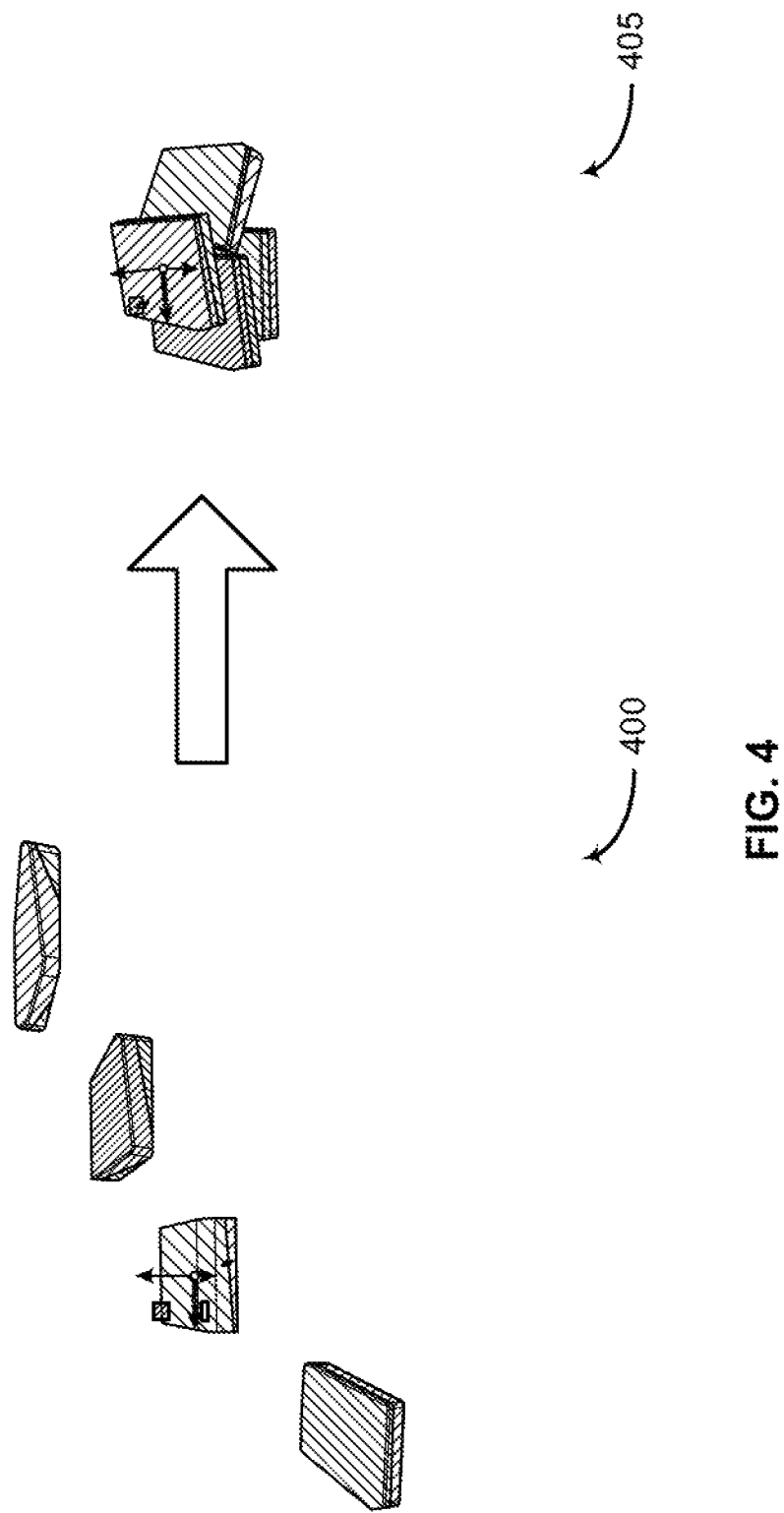

FIG. 4 shows an example of editing a 3D scene according to aspects of the present disclosure. The example shown includes original 3D scene 400 and edited 3D scene 405. FIG. 4 illustrates an example in which multiple objects are efficiently arranged in a non-overlapping way using a constrained physics simulation.

According to some embodiments, 3D manipulation tool integrates physics simulation with interactive user manipulation (i.e., manipulation inputs). 3D manipulation tool regulates how much physics a user injects during each edit based on user feedback to ensure stable changes and fully controllable motions. 3D manipulation tool allows the user to focus on high-level goals for manipulation while the physical simulation itself provides low-level natural adjustments and prevents objects from intersecting.

According to an embodiment, 3D manipulation tool includes 3D modelling application, physics engine, and interface component. The 3D modelling application is configured to represent original 3D scene 400. The user is able to view original 3D scene 400 on the user device. The physics engine is configured to perform a physics simulation on original 3D scene 400 based on a manipulation input from the 3D modelling application (e.g., a user clicks on an object drags the object in a direction, rotates an object), where the physics simulation comprises a set of simulation steps performed based on a set of motion constraints. An interface component is configured to convert the manipulation input from the 3D modelling application into a set of parameters for performing the physics simulation. The interface component is further configured to convert an output of the physics simulation into a change command within the 3D modelling application. The 3D modelling application applies the change command to objects of original 3D scene 400 to produce edited 3D scene 405.

According to an example, original 3D scene 400 includes a set of four textbooks that are spaced apart from each other. The textbooks may have different dimensions and weights. The user can use the 3D manipulation tool to edit the 3D scene (e.g., click on an object, drag the object in an arbitrary direction, rotate the object about an axis, adjust angle of the object with respect to another object). For example, the user can rotate the set of books, move the set of books away from each other, move the set of books close to each other, stack one of the books on top of another book, etc.

In this example, the user uses the 3D manipulation tool to stack the books on top of each other. Edited 3D scene 405 includes one book located at the bottom, two books sitting next to each other on top of the book at the bottom, and a fourth book stacked on the top. In edited 3D scene 405, stacked books are stable and the fourth book on the top does not easily slide off due to gravity because the 3D manipulation tool does not receive secondary physics effects that make it hard to control these changes (e.g., motions do not continue to change once manipulation is over, contacts do not respond with bouncing). In addition, the layout of the books looks natural and the books do not intersect with each other. In this way, the 3D manipulation tool enables the user to focus on high-level editing goals for manipulation while the physical simulation of the physics engine provides low-level natural adjustments and prevents objects from intersecting.

FIG. 5 shows an example of editing a 3D scene according to aspects of the present disclosure. The example shown includes original 3D scene 500 and edited 3D scene 505. Specifically, FIG. 5 illustrates an example in which a gravity simulation is used to generate a natural arrangement of objects.

In some examples, the 3D scene includes a set of objects, the physics simulation is based on the set of objects, and the change to the 3D scene includes adjusting a position or an orientation of each of the set of objects. According to an example, original 3D scene 500 includes a table, a flat bowl disposed on the surface of the table, and a set of fruits. In original 3D scene 500, the set of fruits (i.e., apple, banana) are falling into the bowl due to gravity. In this example, the 3D manipulation tool is used to simulate the process of the set of fruits falling into the bowl (i.e., manipulation input). Edited 3D scene 505 includes the same table and same flat bowl disposed on the surface of the table. Based on user's manipulation input, the set of fruits are disposed in the bowl and static.

When falling into the bowl, the set of fruits may bounce to each other. However, according to an embodiment, the response is stable because the 3D manipulation tool does not receive secondary physics effects that make it hard to control these changes (e.g., motions do not continue to change once manipulation is over, contacts do not respond with bouncing). The set of fruits does not bounce against the surface of the bowl or other objects out of the bowl due to physics such as gravity, inertia and motion. In this way, the user can easily manage the objects and continue to edit the scene and manipulate the set of objects based on the edited 3D scene 505. For example, the user can click on one of the fruits (in the bowl now), move that fruit away from other fruits, or move that fruit out of the bowl.

FIG. 6 shows an example of a physics simulation algorithm according to aspects of the present disclosure. First algorithm 600 illustrates a physics based layout stepping method (i.e., physics simulation method). The input to first algorithm 600 is an operation set $\mathcal{S}$ which contains pairs (o, T), where o∈$\mathcal{O}$ is a rigid body in the 3D scene with its requested transform T. The requested transform T is from a user editing the 3D scene. The input to first algorithm 600 also includes maxlte, and thres (line 1). maxlte is the number of substeps, where the physics simulation algorithm takes this number of substeps towards the target transform. maxlte is determined by the distance between start and end transform. In some cases, maxlte is determined by a fixed size heuristic. thres is a threshold number of simulation steps. For every rigid body in the scene, first algorithm 600 initializes the rigid body's interpolator/substepper $\Delta_o$ using current transformation c and target transformation T (line 2 to 3). Two variables, r and j, are initialized and set to zero. First algorithm 600 includes a condition check (i.e., if target drifts too far apart, the transform is ended at this step). First algorithm 600 terminates the transform at the fourth iteration because i increases by one for each loop iteration (line 5) and j does not increment. Hence, i–j>3 (line 6). In some cases, j is also incremented by one for at least one of the previous iterations (at line 14). For each rigid body in the scene, first algorithm 600 calculate j-th interpolated transformation for the current substep with $\Delta_o$. First algorithm 600 also sets six digress of freedom (6DOF) constraint position of o relative to x (lines 8, 9 and 10). Degrees of freedom (DOF) is used in selecting the appropriate constraints to define a mechanism's ability to move. The number of DOF represents the number of independent parameters needed to specify the position or motion of each body in the system (e.g., 3D modeling system). A predefined constraint set defines a connection between two bodies. The constraints in the set act as restrictions on the motion of bodies relative to each other, reducing total possible DOF of the system. Each constraint restricts movement in a specific way. 6DOF constraint is used to indicate a connection that has three rotational and three translational motion axes. The motion of the components relative to one another in the system does not change because no actual constraints are applied. A completely unconstrained body has six degrees of freedom, three translational and three rotational. In some examples, 6DOF indicates that an object of the system can rotate and translate in any direction.

First algorithm 600 calls forward-time-step (line 11). Each call to forward-time-step advances the rigid body system forward by a single step subject to contact constraints and spring forces. According to an embodiment, linear complementarity programing (LCP) rigid-body contact solver is used. Each time-step computes the solution of a local LCP optimization task where first algorithm 600 solves for unknown constraint enforcing impulses that provide new transform updates.

Another variable r is initiated. First algorithm 600 calculates the residual (error) of current simulation step and assigns the residual to variable r (line 12). If the residual r is less than a threshold value thres, then j is incremented by one (line 14). Recall j can be incremented along with i to avoid termination at the condition check (line 6). Lastly, first algorithm 600 returns all achieved transformations of each object and converts back to the 3D modeling application of the 3D manipulation tool.

According to an embodiment, to solve the constrained physics task, first algorithm 600 measures the potential usability of each time-step's output by referencing the residual (error) of the optimization after the time-step is solved. If this measure is too large, the time-step solve is repeated without advancing the target to the next increment. If the time-step solve residual r is below a tolerance threshold thres (lines 13 and 14), first algorithm 600 advances the target to the next increment. When either the full sequence of substeps (i.e., maxlte) is completed, or the tolerance threshold (i.e., thres) has not been met for three consecutive substeps (line 6), the interaction layer passes the resulting final simulated transformation update back as the requested physics manipulation update (line 7, "break", the transformation is terminated). Note $r \leftarrow \max_{i \in [1,m]} r_i$ defines the largest constraint error in the current solution and measures how much the current time-step solve (if it is accepted) would violate the contact and spring constraints. In some examples, an aggressive threshold of thres=10 is used. If the residual error r is too large, first algorithm 600 takes another time-step without advancing the target. The underlying physics engine solver is iterative (recall PGS-based) and resumes reducing the error right where the previous time-step solve ended and warm-starts the next time-step solve with the output from the previous solution.

Figure 7:
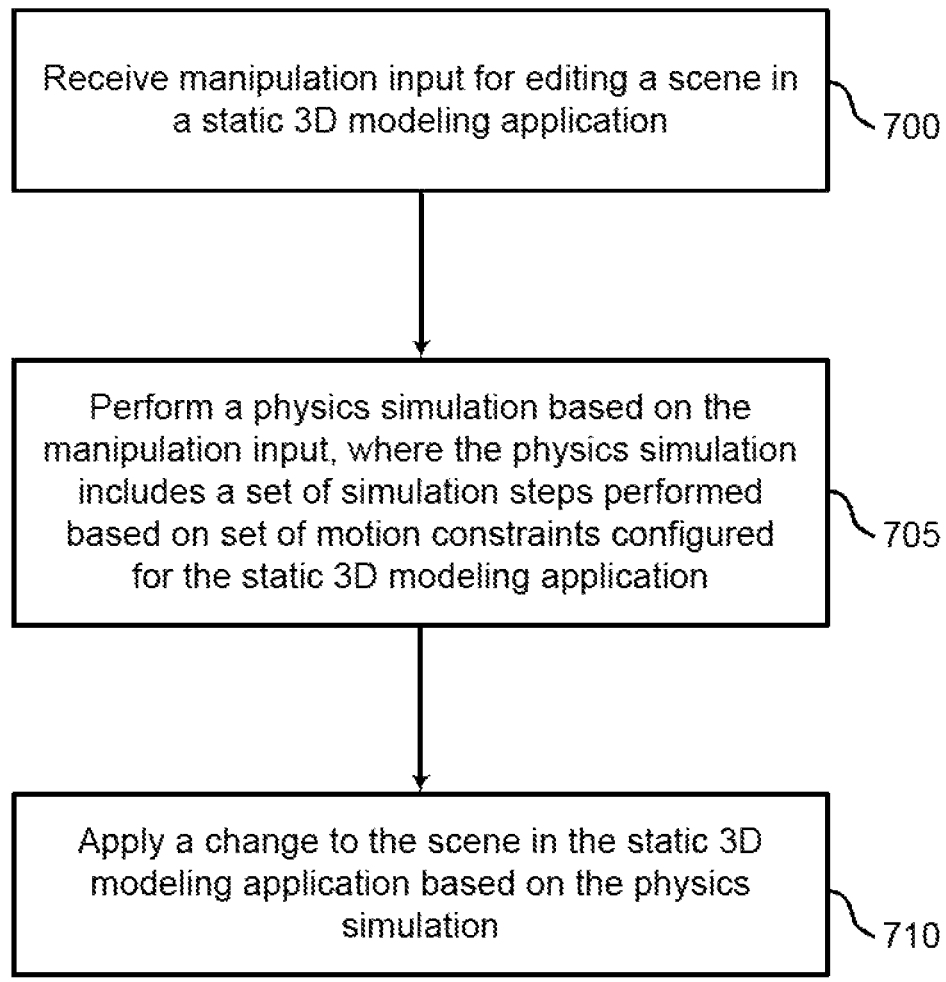
FIG. 7 shows an example of a process for 3D modeling according to aspects of the present disclosure.

FIG. 7 shows an example of a process for 3D modeling according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 700, the system receives manipulation input for editing a scene in a static 3D modeling application. The scene includes a set of objects, the physics simulation is based on the set of objects, and the change to the scene includes adjusting a position or an orientation of each of the set of objects. According to an embodiment, the system uses physics based layout methods to bind 3D manipulation input such as translation, rotation, and scaling to physics-based manipulation. In some cases, the operations of this step refer to, or may be performed by, a 3D modelling application as described with reference to FIGS. 2 and 3.

According to an embodiment, 3D modeling application tracks a set of 3D rigid-body geometries and each rigid body is defined by a triangle mesh in a starting (canonical) configuration with its center of mass initially placed at the origin and oriented so that its principle three axes are aligned with the axes in 3D. Each rigid body's current position and orientation is set by a rigid transform that transforms (e.g., rotates and translates) this geometry from the canonical one.

At operation 705, the system performs a physics simulation based on the manipulation input, where the physics simulation includes a set of simulation steps performed based on set of motion constraints configured for the static 3D modeling application. According to some embodiments, the physics engine of the system performs the physics simulation based on the manipulation input. The physics engine performs the set of simulation steps. The physics engine determines that the threshold number of simulation steps has been met, or that the target condition has been met. In some cases, the operations of this step refer to, or may be performed by, a physics engine as described with reference to FIGS. 2 and 3.

According to an embodiment, the system integrates the physics simulation with interactive user manipulation requests. The physics engine regulates how much physics to inject during each edit based on user feedback. In another embodiment, interaction is performed by overloading each manipulation's requested state change. Instead of performing the requested operation directly on the input geometries (i.e., 3D digital objects), the system passes manipulation commands to an interaction layer that mediates between a customized physics simulation engine and a graphics interface. The interaction layer is configured to locate a new set of transformations that balance between the requested high-level geometry change (e.g., a rotation) and physics with no intersections. When the new transformations are computed, they are passed back to the UI in place of the usual direct transformations.

At operation 710, the system applies a change to the scene in the static 3D modeling application based on the physics simulation. 3D modelling application applies the change to the scene in the static 3D modeling application based on a result of the set of simulation steps. The static 3D modeling application generates an edited 3D scene. In some examples, the edited 3D scene consists of the same set of objects as in the original 3D scene before manipulation and physics simulation. However, the set of objects are in different position and/or layout. For example, the original 3D scene includes four books spaced apart from each other. The edited 3D scene includes the same four books stacked on top of each other. In this example, the layout of the four books is natural and non-intersecting. A user may continue to manipulate the edited 3D scene (click on one of the objects, drag an object along an arbitrary direction, rotate one of the objects). In some cases, the operations of this step refer to, or may be performed by, a 3D modelling application as described with reference to FIGS. 2 and 3.

Figure 8:
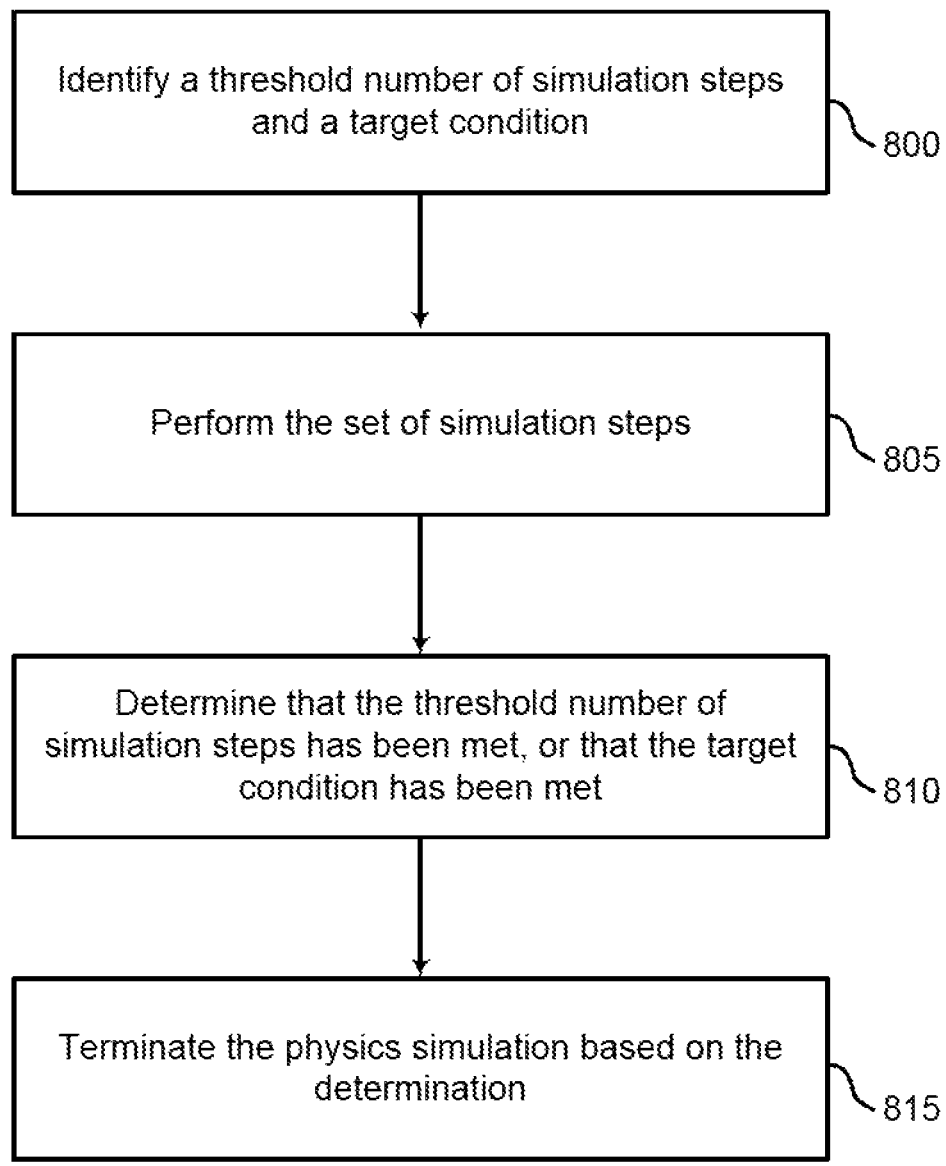
FIG. 8 shows an example of a process for performing a physics simulation according to aspects of the present disclosure.

FIG. 8 shows an example of a process for performing a physics simulation according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 800, the system identifies a threshold number of simulation steps and a target condition. According to some embodiments, interface component of the system identifies a threshold number of simulation steps and a target condition. The interface component identifies a set of simulation parameters for each of the set of simulation steps, where the set of simulation steps are performed based on the corresponding set of simulation parameters. In some examples, the set of simulation parameters includes a target location and a spring force. In some cases, the operations of this step refer to, or may be performed by, an interface component as described with reference to FIGS. 2 and 3.

According to an embodiment, for each interaction, transformations are set as strong springs that incrementally pull a single geometry or group (when group select is enabled) of objects towards goal targets (i.e., target condition). The goal targets are the configurations (e.g., rotation and/or translation) the geometries would reach if no mediation via physics layout is applied.

At operation 805, the system performs the set of simulation steps. According to an embodiment, a single simulated step to complete a goal target is not stable or natural-looking. This occurs when current geometries are at a distance from the edit's target. To support practical size edits and manipulations, the interaction layer (i.e., the interface component) breaks each requested transformation into a sequence of smaller substeps whose interpolation leads to the final requested transform (per a group of objects or single object).

According to an embodiment, the system moves the spring-based target sequentially along this path and, for each step, solves a simulation time-step. When the system calls the simulation time-step, a new numerical optimization task is solved through satisfying the damped physics model pulled by the spring and at the same time resolving any collision constraints applied by contacting geometries. In some cases, the operations of this step refer to, or may be performed by, a physics engine as described with reference to FIGS. 2 and 3.

At operation 810, the system determines that the threshold number of simulation steps has been met, or that the target condition has been met. According to an embodiment, the system measures the potential usability of each time-step's output by looking at the residual (error) of the optimization after the time-step is solved. If this measure is too large, the time-step solve is repeated without advancing the target to the next increment. In some cases, if the time-step solve residual is below the tolerance threshold value, the system advances the target to the next increment. When either the full sequence of substeps is completed, or the tolerance has not been met for three consecutive substeps, the interaction layer passes the resulting final simulated transformation update back as the requested physics manipulation update. However, embodiments of the present disclosure are not limited to three consecutive substeps (i.e., the threshold number of simulation steps). In some cases, the threshold number of simulation steps may be ten. In some cases, the operations of this step refer to, or may be performed by, a physics engine as described with reference to FIGS. 2 and 3.

At operation 815, the system terminates the physics simulation based on the determination. When either the full sequence of substeps is completed, or the tolerance has not been met for three consecutive substeps, the interaction layer passes the resulting final simulated transformation to the 3D modeling application. The 3D modeling application provides the user with edited 3D scene. The edited 3D scene consists of the same set of objects. In some cases, the operations of this step refer to, or may be performed by, a physics engine as described with reference to FIGS. 2 and 3.

Figure 9:
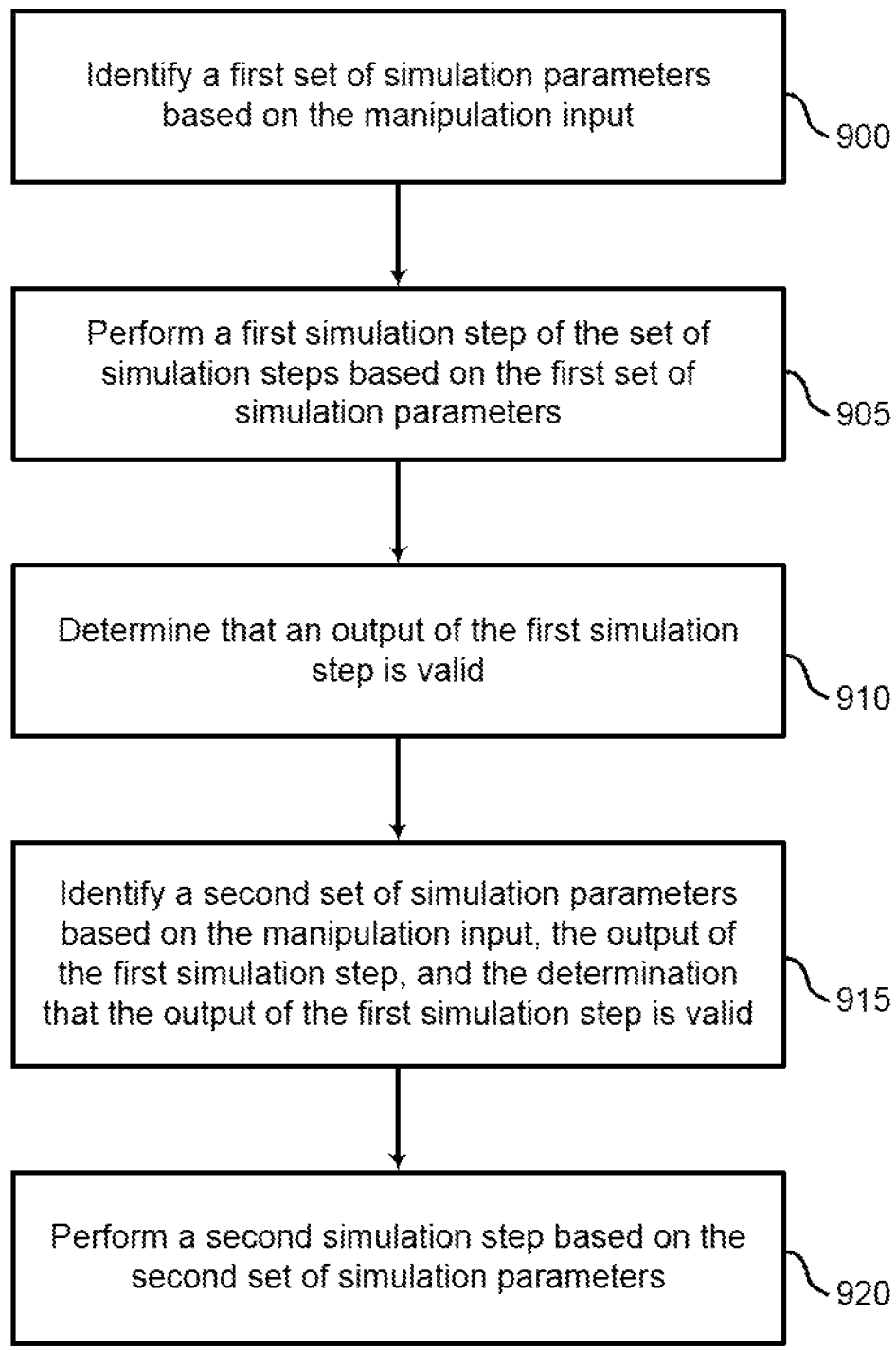
FIG. 9 shows an example of a process for performing simulation steps according to aspects of the present disclosure.

FIG. 9 shows an example of a process for performing simulation steps according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 900, the system identifies a first set of simulation parameters based on the manipulation input. According to some embodiments, an interface component of the system identifies a threshold number of simulation steps and a target condition. The interface component identifies a first set of simulation parameters for a first simulation step of the set of simulation steps, where the simulation steps are performed based on the corresponding set of simulation parameters. The first set of simulation parameters includes a target location and a spring force. In some cases, the operations of this step refer to, or may be performed by, an interface component as described with reference to FIGS. 2 and 3.

At operation 905, the system performs a first simulation step of the set of simulation steps based on the first set of simulation parameters. According to some embodiments, the system identifies a set of motion constraints. The motion constraints prevent different objects from occupying the same space. Alternatively or additionally, the motion constraints prevent momentum from being transferred from one object to another object. In some examples, the motion constraints include a Rayleigh dampening parameter that reduces a velocity of at least one objects by over 90 percent during each of the set of simulation steps. In some cases, the operations of this step refer to, or may be performed by, a physics engine as described with reference to FIGS. 2 and 3.

According to an embodiment, as illustrated in algorithm 1, each function call to forward-time-step advances the rigid body system forward by a single step subject to contact constraints and spring forces. In some examples, linear complementarity programing (LCP) rigid-body contact solver is used. Each time-step computes the solution of a local LCP optimization task where the system solves for unknown constraint enforcing impulses that provide new transform updates. To obtain constraint impulses at each step, the LCP conditions are solved.

At operation 910, the system determines that an output of the first simulation step is valid. One embodiment of the present disclosure measures the potential usability of each time-step's output by looking at the residual (error) of the optimization after the time-step is solved. If this measure is too large, the time-step solve is repeated without advancing the target to the next increment. If the time-step solve residual is below a tolerance threshold, the system advances the target to the next increment. When either the full sequence of substeps is completed, or the tolerance threshold has not been met for three consecutive substeps, the interaction layer (i.e., the interface component) passes the resulting final simulated transformation update back as the requested physics manipulation update. In some cases, the operations of this step refer to, or may be performed by, a physics engine as described with reference to FIGS. 2 and 3.

At operation 915, the system identifies a second set of simulation parameters based on the manipulation input, the output of the first simulation step, and the determination that the output of the first simulation step is valid. In some cases, the operations of this step refer to, or may be performed by, an interface component as described with reference to FIGS. 2 and 3.

At operation 920, the system performs a second simulation step based on the second set of simulation parameters. The interface component of the system identifies a second set of simulation parameters for a second simulation step of the set of simulation steps, where the set of simulation steps are performed based on the corresponding set of simulation parameters. The second set of simulation parameters includes a target location and a spring force. In some cases, the operations of this step refer to, or may be performed by, a physics engine as described with reference to FIGS. 2 and 3.

Figure 10:
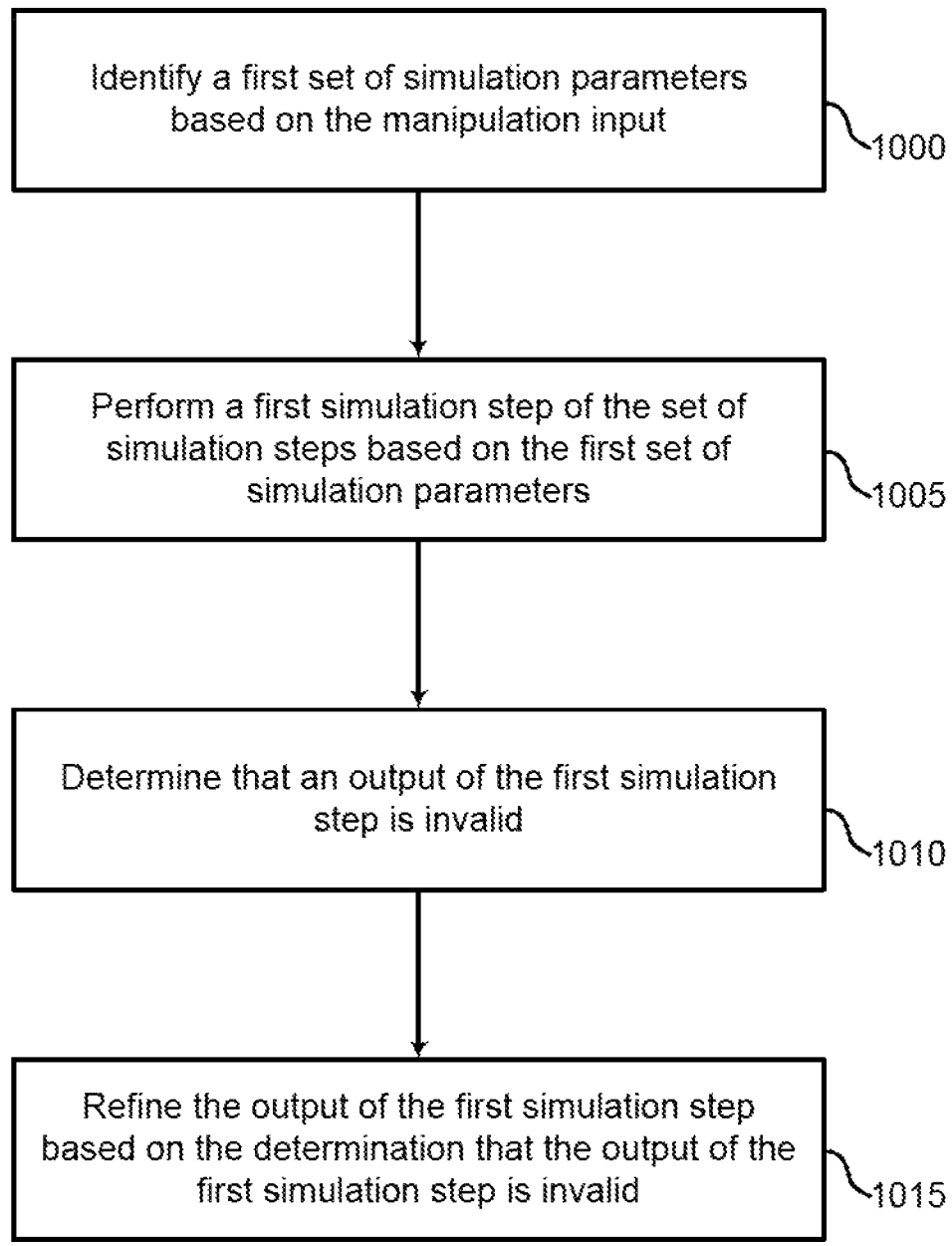
FIG. 10 shows an example of a process for validating a simulation step according to aspects of the present disclosure.

FIG. 10 shows an example of a process for validating a simulation step according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1000, the system identifies a first set of simulation parameters based on the manipulation input. According to an embodiment, requested operations for manipulating geometries are received as a set of requested transforms for bodies. The manipulation input includes an operation set having pairs of information. The pair of information include a rigid body in an original 3D scene and its corresponding requested transform. The requested transform may be specified by the operation applied by a user in the user interface associated with the 3D manipulation tool. In some cases, the operations of this step refer to, or may be performed by, an interface component as described with reference to FIGS. 2 and 3.

According to some embodiments, an interface component of the system identifies a threshold number of simulation steps and a target condition. The interface component identifies a first set of simulation parameters for a first simulation step of the set of simulation steps, where the simulation steps are performed based on the corresponding set of simulation parameters. The first set of simulation parameters includes a target location and a spring force. The first set of simulation parameters is used to compute new transforms for all rigid bodies in the 3D scene, where the first set of simulation parameters meet the requested motion and physical constraints.

At operation 1005, the system performs a first simulation step of the set of simulation steps based on the first set of simulation parameters. According to an embodiment, each function call to forward-time-step advances the rigid body system forward by a single step subject to contact constraints and spring forces, as illustrated in algorithm 1. In some cases, the operations of this step refer to, or may be performed by, a physics engine as described with reference to FIGS. 2 and 3.

At operation 1010, the system determines that an output of the first simulation step is invalid. One embodiment of the present disclosure measures the potential usability of each time-step's output by looking at the residual (error) of the optimization after the time-step is solved. If this measure is too large, the time-step solve is repeated without advancing the target to the next increment. If the time-step solve residual is below a tolerance threshold, the system advances the target to the next increment. In some cases, the operations of this step refer to, or may be performed by, a physics engine as described with reference to FIGS. 2 and 3.

At operation 1015, the system refines the output of the first simulation step based on the determination that the output of the first simulation step is invalid. The system defines the largest constraint error in the current solution and measures how much the current time-step solve (if it is accepted) would violate the contact and spring constraints. In some examples, an aggressive threshold of thres=10 is used. If the residual (error) is too large, the system takes another time-step without advancing the target. The underlying physics engine solver is iterative (recall PGS-based) and resumes reducing the error right where the previous time-step solve ended and warm-starts the next solve with the output from the previous solution. In some cases, the operations of this step refer to, or may be performed by, a physics engine as described with reference to FIGS. 2 and 3.

Figure 11:
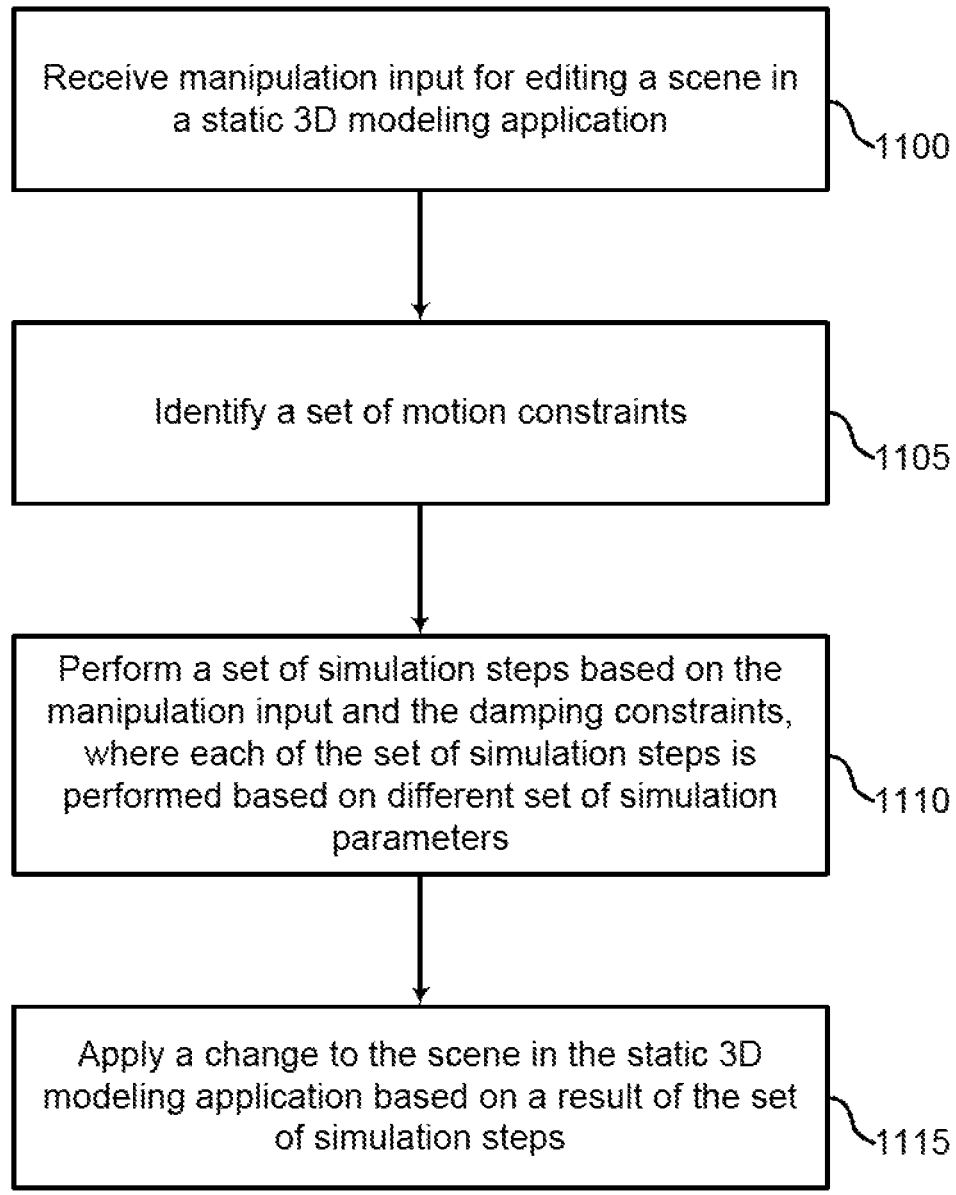
FIG. 11 shows an example of a process for 3D modeling according to aspects of the present disclosure.

FIG. 11 shows an example of a process for 3D modeling according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1100, the system receives manipulation input for editing a scene in a static 3D modeling application. A user input manipulation commands from the user interface of the 3D manipulation tool. For example, the original 3D scene includes a set of books spaced apart from each other. The user requests geometric transforms on the books through stacking the books on top of one another (e.g., click on the books and drag them close to one another). In some cases, the operations of this step refer to, or may be performed by, a 3D modelling application as described with reference to FIGS. 2 and 3.

At operation 1105, the system identifies a set of motion constraints. According to some embodiments, an interface component of the system identifies a set of motion constraints. The motion constraints prevent different objects from occupying the same space. The motion constraints prevent momentum from being transferred from one object to another object. In some examples, the motion constraints include a Rayleigh dampening parameter that reduces a velocity of at least one objects by over 90 percent during each of the set of simulation steps. In some cases, the operations of this step refer to, or may be performed by, an interface component as described with reference to FIGS. 2 and 3.

According to an embodiment, the system damps the physics simulation to obtain a quasi-static motion to obtain stable, responsive physics from user input. Velocities are rapidly dissipated, and collision-response does not include restitution. The system allows manipulated objects to respond in intuitive ways to contact with inertia (e.g., a rod pulled against an edge rotates about it) but at the same time the response is stable. The secondary physics effects are avoided such that the system can easily control these changes (e.g. motions do not continue to change once manipulation is ended, contacts do not respond with bouncing).

At operation 1110, the system performs a set of simulation steps based on the manipulation input and the damping constraints, where each of the set of simulation steps is performed based on different set of simulation parameters. Taking a single simulated step to complete a goal target is not stable or natural looking. This occurs when current geometries are at a distance from the edit's target. To support practical size edits and manipulations, the system breaks each requested transformation into a sequence of smaller substeps whose interpolation leads to the final requested transform (per a group of objects or a single object). In some cases, the operations of this step refer to, or may be performed by, a physics engine as described with reference to FIGS. 2 and 3.

At operation 1115, the system applies a change to the scene in the static 3D modeling application based on a result of the set of simulation steps. The system produces an edited 3D scene including a same set of objects as in the original 3D scene. However, the location, angle, distance of each object is changed by the system based on the manipulation input. The user is able to further manipulate the edited 3D scene. The change to the 3D scene is consistent with the requested high-level geometry change (e.g., rotation) and physics without any intersections. In this way, the user focuses on high-level editing tasks and avoids detailed fine-tuning. In some cases, the operations of this step refer to, or may be performed by, a 3D modelling application as described with reference to FIGS. 2 and 3.

Accordingly, the present disclosure includes at least the following embodiments.

A method for three-dimensional (3D) modeling is described. Embodiments of the method are configured to receive manipulation input for editing a scene in a static 3D modeling application, perform a physics simulation based on the manipulation input, wherein the physics simulation comprises a plurality of simulation steps performed based on a set of motion constraints configured for the static 3D modeling application, and apply a change to the scene in the static 3D modeling application based on the physics simulation.

An apparatus for 3D modeling is described. The apparatus includes a processor, memory in electronic communication with the processor, and instructions stored in the memory. The instructions are operable to cause the processor to receive manipulation input for editing a scene in a static 3D modeling application, perform a physics simulation based on the manipulation input, wherein the physics simulation comprises a plurality of simulation steps performed based on a set of motion constraints configured for the static 3D modeling application, and apply a change to the scene in the static 3D modeling application based on the physics simulation.

A non-transitory computer readable medium storing code for 3D modeling is described. In some examples, the code comprises instructions executable by a processor to: receive manipulation input for editing a scene in a static 3D modeling application, perform a physics simulation based on the manipulation input, wherein the physics simulation comprises a plurality of simulation steps performed based on a set of motion constraints configured for the static 3D modeling application, and apply a change to the scene in the static 3D modeling application based on the physics simulation.

Some examples of the method, apparatus, and non-transitory computer readable medium described above further include identifying a threshold number of simulation steps and a target condition. Some examples further include performing the plurality of simulation steps. Some examples further include determining that the threshold number of simulation steps has been met, or that the target condition has been met. Some examples further include terminating the physics simulation based on the determination.

Some examples of the method, apparatus, and non-transitory computer readable medium described above further include identifying a set of simulation parameters for each of the plurality of simulation steps, wherein the plurality of simulation steps are performed based on the corresponding set of simulation parameters. In some examples, the set of simulation parameters includes a target location and a spring force.

Some examples of the method, apparatus, and non-transitory computer readable medium described above further include identifying a first set of simulation parameters based on the manipulation input. Some examples further include performing a first simulation step of the plurality of simulation steps based on the first set of simulation parameters. Some examples further include determining that an output of the first simulation step is valid. Some examples further include identifying a second set of simulation parameters based on the manipulation input, the output of the first simulation step, and the determination that the output of the first simulation step is valid. Some examples further include performing a second simulation step based on the second set of simulation parameters.

Some examples of the method, apparatus, and non-transitory computer readable medium described above further include performing a constraint minimization computation on the output of the first simulation step, wherein the determination that the output of the first simulation step is valid is based on the constraint minimization computation.

Some examples of the method, apparatus, and non-transitory computer readable medium described above further include identifying a first set of simulation parameters based on the manipulation input. Some examples further include performing a first simulation step of the plurality of simulation steps based on the first set of simulation parameters. Some examples further include determining that an output of the first simulation step is invalid. Some examples further include refining the output of the first simulation step based on the determination that the output of the first simulation step is invalid.

Some examples of the method, apparatus, and non-transitory computer readable medium described above further include performing a constraint minimization computation on the output of the first simulation step, wherein the determination that the output of the first simulation step is invalid is based on the constraint minimization computation.

Some examples of the method, apparatus, and non-transitory computer readable medium described above further include generating a still image of the scene based on the applied change.

Some examples of the method, apparatus, and non-transitory computer readable medium described above further include receiving user mode selection input selecting a simulation mode from a set of modes including the simulation mode and a direct manipulation mode, wherein the physics simulation is performed based on the selecting the simulation mode and the direct manipulation mode does not utilize the physics simulation.

In some examples, the scene includes a plurality of objects, the physics simulation is based on the plurality of objects, and the change to the scene includes adjusting a position or an orientation of each of the plurality of objects.

In some examples, the manipulation input comprises a direct manipulation command for the static 3D modeling application that is independent of the physics simulation.

Some examples of the method, apparatus, and non-transitory computer readable medium described above further include capturing one or more motion inputs from an input device, wherein the manipulation input includes the one or more motion inputs.

A method for 3D modeling is described. Embodiments of the method are configured to receive manipulation input for editing a scene in a static 3D modeling application, identify a set of motion constraints, perform a plurality of simulation steps based on the manipulation input and the motion constraints, wherein each of the plurality of simulation steps is performed based on different set of simulation parameters, and apply a change to the scene in the static 3D modeling application based on a result of the plurality of simulation steps.

An apparatus for 3D modeling is described. The apparatus includes a processor, memory in electronic communication with the processor, and instructions stored in the memory. The instructions are operable to cause the processor to receive manipulation input for editing a scene in a static 3D modeling application, identify a set of motion constraints, perform a plurality of simulation steps based on the manipulation input and the motion constraints, wherein each of the plurality of simulation steps is performed based on different set of simulation parameters, and apply a change to the scene in the static 3D modeling application based on a result of the plurality of simulation steps.

A non-transitory computer readable medium storing code for 3D modeling is described. In some examples, the code comprises instructions executable by a processor to: receive manipulation input for editing a scene in a static 3D modeling application, identify a set of motion constraints, perform a plurality of simulation steps based on the manipulation input and the motion constraints, wherein each of the plurality of simulation steps is performed based on different set of simulation parameters, and apply a change to the scene in the static 3D modeling application based on a result of the plurality of simulation steps.

Some examples of the method, apparatus, and non-transitory computer readable medium described above further include receiving input from a user specifying one or more of the motion constraints, wherein a physics simulation is performed based on the received input.

In some examples, the motion constraints prevent different objects from occupying the same space. In some examples, the motion constraints prevent momentum from being transferred from one object to another object.

In some examples, the motion constraints comprise a Rayleigh dampening parameter that reduces a velocity of at least one objects by over 90 percent during each of the plurality of simulation steps.

An apparatus for 3D modeling is described. The apparatus includes a 3D modelling application configured to represent a 3D scene, a physics engine configured to perform a physics simulation on the 3D scene based on a manipulation input from the 3D modelling application, wherein the physics simulation comprises a plurality of simulation steps performed based on a set of motion constraints, and an interface component configured to convert the manipulation input from the 3D modelling application into a set of parameters for performing the physics simulation.

A method of providing an apparatus for 3D modeling is described. The method includes a 3D modelling application configured to represent a 3D scene, a physics engine configured to perform a physics simulation on the 3D scene based on a manipulation input from the 3D modelling application, wherein the physics simulation comprises a plurality of simulation steps performed based on a set of motion constraints, and an interface component configured to convert the manipulation input from the 3D modelling application into a set of parameters for performing the physics simulation.

In some examples, the interface component is further configured to convert an output of the physics simulation into a change command within the 3D modelling application.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method for three-dimensional (3D) modeling, comprising:
    receiving manipulation input indicating an end state for editing a scene in a static 3D modeling application;
    identifying an initial rigid transform and a target rigid transform of an object in the scene, wherein the initial rigid transform represents an initial state of the object in the scene and the target rigid transform represents the end state indicated by the manipulation input;
    identifying a number of simulation steps based on the initial rigid transform and the target rigid transform;
    computing a force parameter based on the target rigid transform and a set of motion constraints corresponding to the scene in the static 3D modeling application;
    interpolating between the initial rigid transform and the target rigid transform by performing a simulation based on the force parameter, the set of motion constraints, and the number of simulation steps; and
    generating a modified scene in the static 3D modeling application corresponding to the end state based on the interpolation, wherein a modified end state of the modified scene differs from the end state indicated by the manipulation input based on the set of motion constraints.

2. The method of claim 1, further comprising:
identifying a threshold number of simulation steps and a target condition;
performing the number of simulation steps;
determining that the threshold number of simulation steps has been met, or that the target condition has been met; and
terminating the simulation based on the determination.

3. The method of claim 1, further comprising:
identifying a set of simulation parameters for each of the number of simulation steps, wherein the number of simulation steps are performed based on a corresponding set of simulation parameters.

4. The method of claim 3, wherein:
the set of simulation parameters includes a target location and a spring force.

5. The method of claim 1, further comprising:
identifying a first set of simulation parameters based on the target rigid transform;
performing a first simulation step of the number of simulation steps based on the first set of simulation parameters;
determining that an output of the first simulation step is valid;
identifying a second set of simulation parameters based on the manipulation input, the output of the first simulation step, and the determination that the output of the first simulation step is valid; and
performing a second simulation step based on the second set of simulation parameters.

6. The method of claim 5, further comprising:
performing a constraint minimization computation on the output of the first simulation step, wherein the determination that the output of the first simulation step is valid is based on the constraint minimization computation.

7. The method of claim 1, further comprising:
identifying a first set of simulation parameters based on the manipulation input;
performing a first simulation step of the number of simulation steps based on the first set of simulation parameters;
determining that an output of the first simulation step is invalid; and
refining the output of the first simulation step based on the determination that the output of the first simulation step is invalid.

8. The method of claim 7, further comprising:
performing a constraint minimization computation on the output of the first simulation step, wherein the determination that the output of the first simulation step is invalid is based on the constraint minimization computation.

9. The method of claim 1, further comprising:
generating a still image of the scene based on a change caused by the simulation applied updated rigid transform.

10. The method of claim 1, further comprising:
receiving user mode selection input selecting a simulation mode from a set of modes including the simulation mode and a direct manipulation mode, wherein the simulation is performed based on the selecting the simulation mode and the direct manipulation mode does not utilize the simulation.

11. The method of claim 1, wherein:
the scene includes a plurality of objects, the simulation is based on the plurality of objects, and a change to the scene includes adjusting a position or an orientation of each of the plurality of objects.

12. The method of claim 1, wherein:
the manipulation input comprises a direct manipulation command for the static 3D modeling application that is independent of the simulation.

13. The method of claim 1, further comprising:
capturing one or more motion inputs from an input device, wherein the manipulation input includes the one or more motion inputs.

14. A method for three-dimensional (3D) modeling, comprising:
receiving manipulation input indicating an end state for editing a scene in a static 3D modeling application;
identifying an initial rigid transform and a target rigid transform of an object in the scene, wherein the initial rigid transform represents an initial state of the object in the scene and the target rigid transform represents the end state indicated by the manipulation input;
identifying a number of simulation steps based on the initial rigid transform and the target rigid transform;
identifying a set of motion constraints corresponding to the scene in the static 3D modeling application;
computing a force parameter based on the target rigid transform and the set of motion constraints corresponding to the scene in the static 3D modeling application;
interpolating between the initial rigid transform and the target rigid transform by performing a simulation based on the force parameter, the set of motion constraints, and the number of simulation steps; and
generating a modified scene in the static 3D modeling application corresponding to the end state based on the interpolation, wherein a modified end state of the modified scene differs from the end state indicated by the manipulation input based on the set of motion constraints.

15. The method of claim 14, further comprising:
receiving input from a user specifying one or more of the set of motion constraints, wherein a physics simulation is performed based on the received input.

16. The method of claim 14, wherein:
the set of motion constraints prevent different objects from occupying a same space.

17. The method of claim 14, wherein:
the set of motion constraints prevent momentum from being transferred from one object to another object.

18. The method of claim 14, wherein:
the set of motion constraints comprise a Rayleigh dampening parameter that reduces a velocity of at least one object by over 90 percent during each of the number of simulation steps.

19. An apparatus for three-dimensional (3D) modeling, comprising:
a static 3D modeling application configured to represent a 3D scene;
a physics engine configured to
compute a force parameter based on a target rigid transform and a set of motion constraints corresponding to the 3D scene in the static 3D modeling application,
interpolate between an initial rigid transform and the target rigid transform by performing a simulation based on the force parameter, the set of motion constraints, and a number of simulation steps, and
generate a modified scene in the static 3D modeling application corresponding to an end state based on the interpolation, wherein a modified end state of the modified scene differs from the end state indicated by a manipulation input based on the set of motion constraints; and
an interface component configured to
identify the initial rigid transform and the target rigid transform of an object in the 3D scene, wherein the initial rigid transform represents an initial state of the object in the 3D scene and the target rigid transform represents the end state indicated by the manipulation input and
identify the number of simulation steps based on the initial rigid transform and the target rigid transform.

20. The apparatus of claim 19, wherein:
the interface component is further configured to convert an output of the simulation into a change command within the static 3D modeling application.

* * * * *